H. KRUESHELD.
WAFFLE IRON.
APPLICATION FILED JULY 15, 1920.
1,438,602.
Patented Dec. 12, 1922.
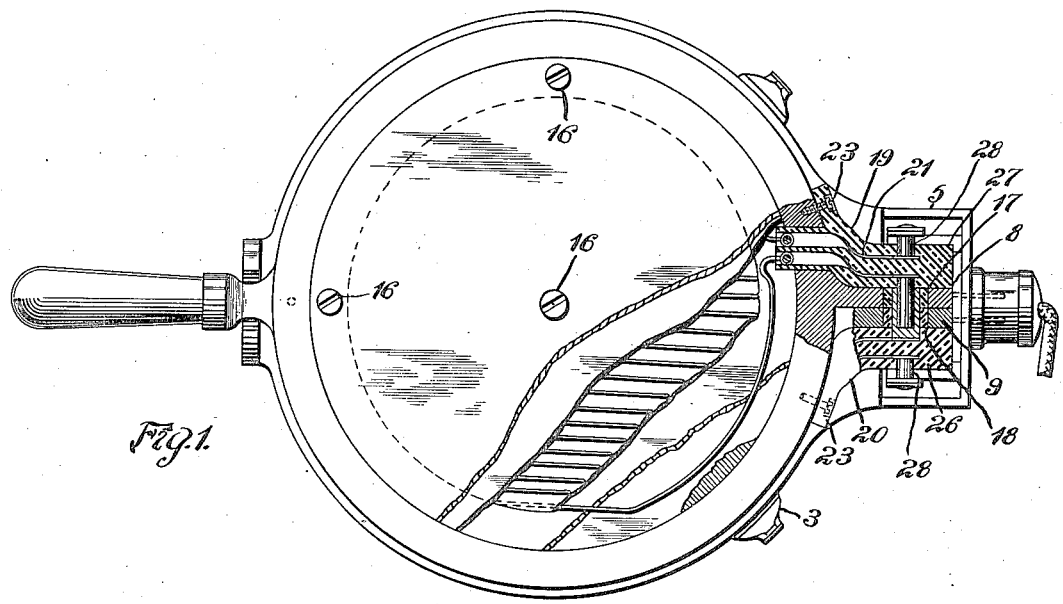
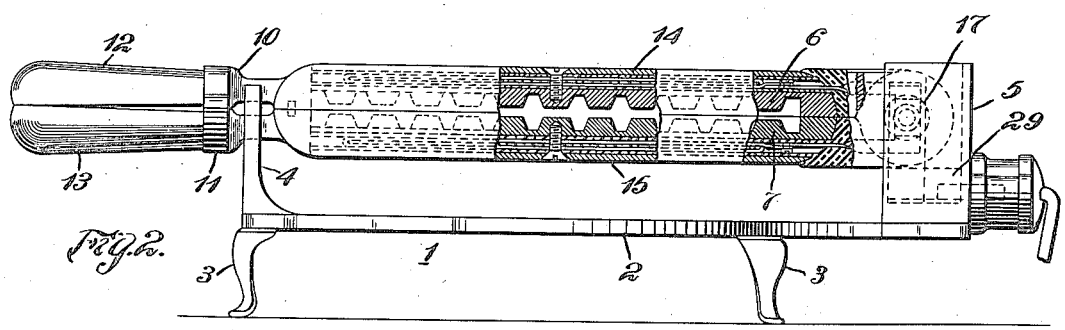
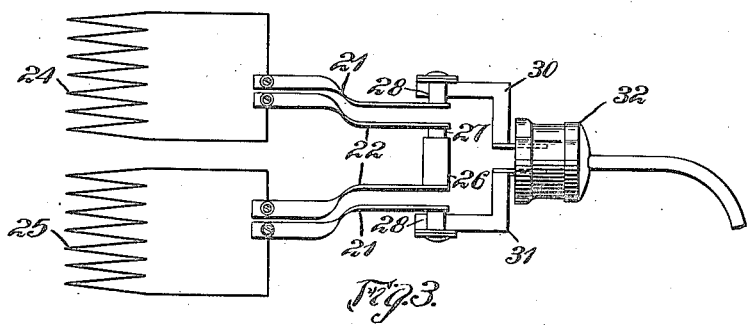
WITNESSES:
INVENTOR
Henry Kruesheld
BY
ATTORNEY Patented Dec. 12, 1922.

1,438,602

UNITED STATES PATENT OFFICE.

HENRY KRUESHELD, OF MANSFIELD, OHIO, ASSIGNOR TO WESTINGHOUSE ELECTRIC PRODUCTS COMPANY, A CORPORATION OF MICHIGAN.

WAFFLE IRON.

Application filed July 15, 1920. Serial No. 396,574.

*To all whom it may concern:*

Be it known that I, HENRY KRUESHELD, a citizen of the United States, and a resident of Mansfield, in the county of Richland and State of Ohio, have invented a new and useful Improvement in Waffle Irons, of which the following is a specification.

My invention relates to electrically-heated apparatus and particularly to electrically-heated cooking apparatus and it has, for one of its objects, to provide electric heating means for a waffle iron.

Another object is to provide a terminal device for an electrically-heated waffle iron which shall be relatively simple and inexpensive and which shall permit an electric current to traverse the heating elements under all conditions of operation of the waffle iron.

More specifically, my invention embodies relatively thin heating elements substantially coextensive with the waffle iron and secured to the outer surface of each half thereof. Terminal members for the heating elements are embedded in a radially-extending insulating member located adjacent to the pivot lugs, the terminal members being so located as to permit of the heating elements on each half of the waffle iron being electrically connected to each other and to the supply circuit.

Referring to the single sheet of drawings,

Figure 1 is a top plan view, with certain parts cut away, of a heating apparatus embodying my invention;

Fig. 2 is a view, partly in side elevation and partly in vertical section, of the device shown in Fig. 1, and Fig. 3 is a diagrammatic view of the circuits and of the terminal members used in the device embodying my invention.

A support 1 comprises an annular member 2 provided with a plurality of legs 3, an up-standing member 4 and a terminal-supporting casing 5, the support 4 and the casing 5 being located at diametrically opposite places on the annular member 2. The waffle iron comprises two co-operating metal baking surfaces 6 and 7 of usual form, here shown as substantially circular in contour, and provided with integral pivot lugs 8 and 9, respectively. The pivot lugs 8 and 9 extend radially outward from the periphery of the respective members 6 and 7 and are arranged to co-operate with each other in holding the members 6 and 7 in proper relative positions.

At a point diametrically opposite to the pivot lugs 8 and 9, integral handle lugs 10 and 11 are provided on the members 6 and 7, and suitable handle members 12 and 13 are located therein to permit the baking surfaces 6 and 7 to be handled during the operation of baking.

Heating elements 14 and 15 are located on the outer surfaces of the members 6 and 7 and may be of any well-known construction, and, as here shown, comprise relatively thin heating elements which are substantially coextensive with the members 6 and 7 and are secured thereto by means of a plurality of screws 16, to insure close operative engagement of the heating element with the members 6 and 7. I have shown the usual construction of heating element in order to indicate how such a heater may be applied but, as such heating elements are old in the art, it is believed that detailed description thereof is not necessary.

Substantially cylindrical coaxial openings 17 are provided in the pivot lugs 8 and 9 in which is placed a tubular insulating member 18 for a purpose to be hereinafter set forth. Insulating members 19 and 20, substantially coextensive with the pivot lugs 8 and 9 and extending peripherally around the members 6 and 7 for a relatively short distance, are provided and each member has a plurality of current-conducting members 21 and 22 embedded therein.

The members 19 and 20 may be suitably secured to the members 6 and 7, as by screws 23, and to the pivot lugs 8 and 9 by similar screws (not shown). The inner ends of the conducting members 21 and 22 are connected to the heating elements 24 and 25 in any well known manner.

In order to connect the conducting member 22 in the lower heating element to the conducting member 22 comprising one of the terminals of the upper heating element, the outer end of one of the conducting members 22, connected to the lower heating element 15, is electrically connected to a tubular member 26 which is located in the tubular insulating member 18. The outer end of the conducting strip 22, connected to the upper heater element 14, is suitably secured to a short metal rod 27 which fits into the tubular member 26, thus providing a current path from the terminal of one heating element to the terminal of the other heating element.

A short metal rod or stud 28 is suitably secured to the outer end of each of the conducting strips 21 and extends a relatively short distance beyond the outer surface of the insulating members 19 and 20.

A substantially rectangular block 29 of insulating material is located at the bottom of the casing 5 and has bent conducting metal strips 30 and 31 embedded therein, the outer ends of which are so located and formed as to co-operate with a terminal socket 32 for connection to a suitable source of current. The inner ends of the members 30 and 31 are bent substantially at right angles to the main part thereof, in a vertical position, to form resilient contact terminals and are severally provided with an indentation in which the outer ends of the terminal members 28 may be placed, the location of this indentation being such that the pivot lugs 8 and 9 and the insulating members 19 and 20 rest upon the member 29. A cover member (not shown) may be provided for the top of the casing member 5 in order to give a finished appearance to the casing. The members 26, 27 and 28, being coaxial, the upper baking surface 6 may be angularly displaced with regard to the lower member 7 without interrupting the current flow through the heating elements. The two baking surfaces 6 and 7 may be easily and quickly removed, as a unit, from the support 1 by lifting them therefrom.

It may be noted that I provide current-conducting means which will permit of energizing the two heating elements at all times during the operation of the device whether the waffle-baking surfaces are in operative position or are separated to permit of insertion of fresh material or the removal of the baked material, and that these connecting means are relatively simple and easily applied.

Various changes may be made in the device without departing from the spirit and scope of my invention, and I desire that only such limitations shall be placed thereon as are imposed by the prior art or are specifically set forth in the appended claims.

I claim as my invention:

1. In an electrically-heated apparatus, the combination with two co-operating baking surfaces, of heating means associated with each baking surface, and a hinge member for holding said baking surfaces in relative longitudinal alinement and for conducting current from one heating means to the other.

2. In an electrically-heated apparatus, the combination with a lower baking surface, an upper baking surface and electric heating means associated with each of said baking surfaces, of a hinge member permitting said baking surfaces to have different angular positions relative to each other and electrically connecting said heating means.

3. An electrically-heated waffle iron comprising two superposed co-operating baking surfaces, a heating means secured to each of said baking surfaces and interfitting terminal members for said heating means permitting the angular adjustment of one of said surfaces relative to the other while continuing the supply of energy to said heating elements.

4. In an electrically-heated apparatus, the combination with a supporting member and contact members mounted thereon, of two superposed co-operating baking surfaces, a heating element secured to each of said baking surfaces, and interfitting terminal members for said heating elements operatively engaging said contact members permitting said heating elements being energized while permitting said baking surfaces to have angular movement relative to said supporting member.

5. In an electrically-heated apparatus, the combination with a supporting member and contact members mounted thereon, of two superposed co-operating baking surfaces, a heating element secured to each of said baking surfaces and substantially coextensive therewith, and terminal members for said heating elements permitting said baking surfaces to have angular movement relative to said supporting member and relative to each other while the heating elements are being continuously energized.

6. In an electrically-heated apparatus, the combination with a supporting member and contact members mounted thereon, of two co-operating baking surfaces, a heating element secured to the outer surface of each of said baking surfaces and terminal members for said heating elements operatively engaging each other and said contact members and permitting the angular adjustment of one of said baking surfaces relative to the other and angular movement of both surfaces together relative to said supporting member while the heating elements are continuously energized.

7. In an electrically-heated apparatus, the combination with two co-operating baking surfaces, a heating element secured to each of said baking surfaces, and interfitting terminal members for said heating elements, of a supporting member for said baking surfaces, a plurality of oppositely disposed resilient contact members mounted on said supporting member and operatively engaging said terminal members and permitting said baking surfaces to have angular movement relative to said supporting member and to each other.

8. In an electrically-heated apparatus, the combination with a supporting member and resilient contact members mounted thereon, of two co-operating baking-surface members, a radially-extending pivot lug on each of said members, insulator members substantially coextensive with said pivot lugs and adjacent thereto, a heating element secured to the outer surface of each of said baking-surface members, and terminal members embedded in said insulator members operatively engaging each other and said resilient contact members and permitting the angular adjustment of one of said baking-surface members relative to the other and angular movement of both members together relative to said supporting member.

In testimony whereof, I have hereunto subscribed my name this 23 day of June 1920.

HENRY KRUESHELD.